United States Patent [19]

Dean

[11] Patent Number: 4,562,231

[45] Date of Patent: Dec. 31, 1985

[54] POLYETHER SULFONE RESIN CONTAINING MOLDING COMPOSITION AND METHOD

[75] Inventor: Barry D. Dean, Broomall, Pa.

[73] Assignee: Atlantic Richfield Company, Los Angeles, Calif.

[21] Appl. No.: 647,776

[22] Filed: Sep. 6, 1984

[51] Int. Cl.[4] .................... C08L 81/06; C08L 33/24
[52] U.S. Cl. ................................. 525/189; 525/535
[58] Field of Search ................................ 525/189

[56] References Cited

U.S. PATENT DOCUMENTS 3,755,256  8/1973  Beverly ........................... 525/189
4,020,046  4/1977  Klug et al. ...................... 525/189

FOREIGN PATENT DOCUMENTS 49-128048  7/1974  Japan ............................. 525/189

*Primary Examiner*—Allan M. Lieberman
*Attorney, Agent, or Firm*—Dennis M. Kozak

[57] ABSTRACT

Moldable polymer compositions comprising a polyether sulfone resin and a copolymer containing recurring units of a vinyl aromatic monomer and recurring units of a maleimide monomer are disclosed.

15 Claims, No Drawings

POLYETHER SULFONE RESIN CONTAINING MOLDING COMPOSITION AND METHOD

This invention relates to molding compositions.

More specifically, this invention relates to a moldable composition containing a polyether sulfone resin.

In one of its more specific aspects, this invention relates to the incorporation of a copolymer of a vinyl aromatic monomer and a maleimide monomer into a polyether sulfone resin to reduce the melt viscosity of the polyether sulfone resin.

According to this invention, there is provided a moldable composition comprising a physical mixture of from about 99 to about 1% by weight of a polyether sulfone resin with from about 1 to about 99% by weight of a copolymer containing recurring units of a vinyl aromatic monomer and recurring units of a maleimide monomer.

Also, according to this invention there is provided a method of producing a molded composition which comprises forming a composition comprising a physical mixture of from about 99 to about 1% by weight of a polyether sulfone resin with from about 1 to about 99% by weight of a copolymer containing recurring units of a vinyl aromatic monomer and recurring units of a maleimide monomer, and molding the resulting composition.

According to this invention, there is also provided a method of reducing the melt viscosity of a polyether sulfone resin which comprises incorporating into the polyether sulfone resin a copolymer containing recurring units of a vinyl aromatic monomer and recurring units of a maleimide monomer, the copolymer being present in the polyether sulfone resin in an amount sufficient to reduce the melt viscosity of the polyether sulfone resin.

In the practice of this invention any suitable polyether sulfone resin can be employed. Suitable polyether sulfone resins include poly(diphenyl ether sulfone), poly(diphenyl sulfone-diphenyl ether sulfone)-copolymer and poly(diphenyl sulfone-bisphenol A)-copolymer which is the preferred polyether sulfone.

Poly(diphenyl sulfone-Bisphenol A) copolymer is designated Udel® P-1700 Polysulfone Resin, commercially available from Union Carbide Corporation.

Incorporated herein by reference are the teachings of U.S. Pat. Nos. 4,108,834; 4,275,186 and 4,307,222 which describe the preparation of various polyarylene polyether resins including polyether sulfones and their derivatives.

Preferably, the vinyl aromatic/maleimide copolymer employed in the invention will comprise from about 50 to about 60 mole % recurring units of a vinyl aromatic monomer and from about 50 to about 40 mole % recurring units of a maleimide monomer. The vinyl aromatic/maleimide copolymer should have a peak molecular weight from 50,000 to 500,000; most preferably 50,000 to 150,000.

The vinyl aromatic monomer may be styrene, p-methylstyrene, vinyltoluene, t-butylstyrene, -methylstyrene, monobromostyrene, dibromostyrene, tribromostyrene, monochlorostyrene, dichlorostyrene, trichlorostyrene, dimethylstyrene and the like, and their mixtures. The vinyl aromatic monomer most preferred is styrene.

The maleimide monomer may be maleimide, N-methylmaleimide, N-ethylmaleimide, N-propylmaleimide, N-butylmaleimide, N-phenylmaleimide, N-(tolyl)maleimide, N-(2,5-dimethyl)maleimide, N-(2,6-dimethyl)maleimide, N-(2-chlorophenyl)maleimide, N-(3-chlorophenyl)maleimide, N-(4-chlorophenyl)-maleimide, N-(2,3-dichlorophenyl)maleimide, N-(2,4-dichlorophenyl)maleimide, N-(2,6-dichlorophenyl)-maleimide, N-(2-bromophenyl)maleimide, N-(3-bromophenyl)maleimide, N-(2,3-dibromophenyl)maleimide, N-(2,4-dibromophenyl)maleimide, N-(2,5-dibromophenyl)maleimide, tribromophenylmaleimide, and the like and their mixtures. The maleimide most preferred is N-phenylmaleimide.

The vinyl aromatic/maleimide copolymer can be prepared in a bulk process, a continuous bulk process, a solution process or a suspension process. The preferred method of preparation is a suspension process.

The moldable polyblends of this invention can also include other ingredients such as extenders, fillers, processing aids, pigments, mold release agents and the like, for their conventionally employed purpose. Also, reinforcing fillers in amounts sufficient to impart reinforcement can be incorporated, such as glass flakes and chopped glass fibers.

The following examples serve to demonstrate the invention.

EXAMPLE 1

This example serves to demonstrate the preparation of a styrene/N-phenylmaleimide copolymer suitable for use in this invention by the suspension process.

A citrate bottle was charged with about 140 grams of water, 37.6 grams of styrene, 62.4 grams of N-phenylmaleimide, 0.57 grams of t-butylperoctoate, 0.32 gram of t-butyl perbenzoate, 0.002 gram of sodium bisulfite and 1.8 grams of tricalciumphosphate. The bottle was capped and placed in an oil bath with constant agitation. The bottle was heated to 95° C. for 1.0 hour and then to 140° C. for 3.5 hours. The beads which formed were filtered, acidified to pH=1.0 and washed with water. The total weight of the beads recovered was 99.2 grams (99.2% conversion). The copolymer was analyzed and found to contain 5.1% N which corresponds to 63.02 wt. % N-phenylmaleimide (50 mole %). The copolymer was tested and found to exhibit a glass transition temperature of 223° C. by differential scanning calorimetry. The copolymer had a peak molecular weight of 188,000, a weight average molecular weight (Mw) of 298,000 and a number average molecular weight (Mn) of 129,600.

EXAMPLES 2-4

The following examples demonstrate the preparation of a control and two moldable polyblends of this invention.

Udel® P-1700 Polysulfone Resin, (Union Carbide Corporation), was melt compounded with the styrene/N-phenylmaleimide copolymer produced in Example 1 at 320° C. Various shaped test specimens were molded at 320° C. to assess physical properties and melt rheology. The compositions of the polyblends, their physical properties and melt rheology data are shown in the following Table I.

TABLE I

| | Example No. | | |
|---|---|---|---|
| | 2(control) | 3 | 4 |
| Udel® P-1700 Polysulfone Resin | 100 | 100 | 100 |

TABLE I-continued

| | Example No. | | |
|---|---|---|---|
| | 2(control) | 3 | 4 |
| S/N-PMI (phr) | 0 | 2.5 | 5 |
| Tensile strength (psi) | 10,105 | 10,190 | 10,421 |
| Flex strength (psi) | 16,061 | 16,100 | 16,777 |
| Flex modulus (psi) | 377,040 | 376,200 | 393,560 |
| DTUL (⅛", unannealed) | 329° F. | 329° F. | 329° F. |
| Notched Izod (ft-lbs/in) | 0.98 | 0.85 | 0.85 |
| Gardner Falling Weight Index (in-lbs) | 480+ | 480+ | 480+ |
| Elongation (%) | 74 | 74 | 76 |
| Instron melt rheology (325° C., L/D = 20, $\eta$ poise at): $\dot{\gamma}$ sec$^{-1}$ | | | |
| 29.45 | 19,838 | 17,204 | 15,473 |
| 147.27 | 12,624 | 10,981 | 9,842 |
| 589.09 | 9,211 | 8,327 | 7,184 |
| 2,945.47 | 3,638 | 3,117 | 2,838 |
| 5,890.94 | 2,441 | 2,127 | 1,903 |

The data of Table I serve to show that copolymers of a vinyl aromatic monomer and a maleimide monomer substantially reduce the melt viscosity of polyether sulfone resins without having a deleterious effect on physical properties upon molding.

It will be evident from the foregoing that various modifications can be made to this invention. Such, however, are considered as being within the scope of the invention.

What is claimed is:

1. A moldable polymer composition comprising from about 99 to about 1% by weight of a polyether sulfone resin and from about 1 to about 99% by weight of a copolymer containing from about 50 to about 60 mole % recurring units of a vinyl aromatic monomer and from about 40 to about 50 mole % recurring units of a maleimide monomer, said copolymer having a peak molecular weight within the range of from about 50,000 to about 500,000.

2. The polymer composition of claim 1 in which said maleimide monomer is an N-substituted maleimide monomer.

3. The polymer composition of claim 2 in which said maleimide monomer is N-phenylmaleimide.

4. The polymer composition of claim 1 in which said polyether sulfone resin is selected from the group consisting of poly(diphenyl ether)sulfone, poly(diphenyl sulfone-diphenyl ether sulfone)copolymer and poly(diphenyl sulfone-bisphenol A)copolymer.

5. The polymer composition of claim 1 in which said copolymer is styrene/N-phenylmaleimide.

6. A method of producing a molded polymer composition which comprises forming a blend comprising from about 99 to about 1% by weight of a polyether sulfone resin and from about 1 to about 99% by weight of a copolymer containing from about 50 to about 60 mole % recurring units of a vinyl aromatic monomer and from about 40 to about 50 mole % recurring units of a maleimide monomer said copolymer having a peak molecular weight within the range of from about 50,000 to about 500,000, and molding the resulting blend.

7. The method of claim 6 in which said maleimide monomer is an N-substituted maleimide monomer.

8. The method of claim 6 in which said maleimide monomer is N-phenylmaleimide.

9. The method of claim 6 in which said polyether sulfone resin is selected from the group consisting of poly(diphenyl ether)sulfone, poly(diphenyl-sulfone-diphenyl ether sulfone)copolymer and poly(diphenyl sulfone-Bisphenol A)copolymer.

10. The method of claim 6 in which said copolymer is styrene/N-phenylmaleimide copolymer.

11. A method of reducing the melt viscosity of a polyether sulfone resin upon molding which comprises incorporating into the polyether sulfone resin a copolymer containing from about 50 to about 60 mole % recurring units of a vinyl aromatic monomer and from about 40 to about 50 mole % recurring units of a maleimide monomer, said copolymer having a peak molecular weight within the range of from about 50,000 to about 500,000, the copolymer being incorporated in the polyether sulfone resin in an amount sufficient to reduce the melt viscosity of the polyether sulfone resin upon molding.

12. The method of claim 11 in which said maleimide monomer is an N-substituted maleimide monomer.

13. The method of claim 11 in which said maleimide monomer is N-phenylmaleimide.

14. The method of claim 11 in which said copolymer is styrene/N-phenylmaleimide.

15. The method of claim 11 in which said polyether sulfone resin is selected from the group consisting of poly(diphenyl ether)sulfone, poly(diphenyl-sulfone-diphenyl ether sulfone)copolymer and poly(diphenyl sulfone-Bisphenol A)copolymer.

* * * * *